United States Patent
Davis et al.

(10) Patent No.: US 6,286,487 B1
(45) Date of Patent: Sep. 11, 2001

(54) FUEL CONTROL FOR A VARIABLE CAM PHASE ENGINE

(75) Inventors: Jason Thomas Davis, Williamston; Jay Tolsma, Grand Ledge; Steven J. Haase, Okemos, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/448,900

(22) Filed: Nov. 29, 1999

(51) Int. Cl.$^7$ .................................................. F02M 51/00
(52) U.S. Cl. ............................................ 123/478; 123/480
(58) Field of Search ....................................... 128/478, 480

(56) References Cited

U.S. PATENT DOCUMENTS

| | | | |
|---|---|---|---|
| 5,245,968 | * | 9/1993 | Kolias et al. .......................... 123/480 |
| 5,492,101 | * | 2/1996 | Saito et al. ............................ 123/480 |
| 5,507,265 | * | 4/1996 | Ichikawa et al. ...................... 123/478 |
| 5,730,105 | * | 3/1998 | McGinnity ......................... 2123/305 |
| 5,918,582 | * | 7/1999 | Itoyama et al. ....................... 123/480 |
| 6,085,729 | * | 7/2000 | Kondo et al. ......................... 123/478 |

\* cited by examiner

*Primary Examiner*—John Kwon
(74) *Attorney, Agent, or Firm*—Christopher DeVries

(57) ABSTRACT

An improved fuel compensation method for a variable cam phase engine which predicts the phase of the cam at the midpoint of valve overlap and uses the predicted cam phase to compensate a base fuel pulse for the corresponding amount of diluent. If the cam phase is in transition to a desired value, the cam phase for purposes of compensation may be predicted based on the desired cam phase, current cam phase and its rate of change; otherwise, the cam phase is predicted based on the current cam phase. In a first interval of cam phase transition characterized by nonlinear change in cam phase, the cam phase is predicted by applying a nonlinear offset to the measured cam phase. In a second interval of cam phase transition characterized by substantially linear variation of cam phase, the cam phase is predicted by linear extrapolation of the measured cam phase, and limited to range bounded by the measured cam phase and the desired cam phase.

8 Claims, 3 Drawing Sheets

FUEL CONTROL FOR A VARIABLE CAM PHASE ENGINE

TECHNICAL FIELD

The present invention relates in general to an engine fuel control, and more specifically to a method of compensating the fuel control of an engine in which the camshaft phase angle is changed for control purposes.

BACKGROUND OF THE INVENTION

Accurate control of engine air/fuel ratio requires knowledge of the quantity of fresh air drawn into the engine cylinders -in each engine cycle. Ordinarily, this can be determined either by sensing the mass air flow in the intake manifold of the engine or through a computation involving the engine speed and a measure of the manifold absolute pressure. The fuel pulse width so determined can then be adjusted to account for other factors that influence the air charge. With variable cam phase engines, for example, the phase angle of the cam must be taken into account since changing the cam angle changes the degree of overlap between the cylinder intake and exhaust valves. One way of compensating for the variable cam phasing is to simply measure the actual cam position, and adjust the fuel pulse width to account for the corresponding degree of valve overlap. However, in transient operation, the cam phase continues to change in the interval between fuel pulse width computation and the corresponding combustion cycle, resulting in fueling errors that adversely affect emissions. Accordingly, what is needed is a fuel compensation method that more accurately accounts for the air charge changes due to cam phase angle, even during transient operation.

SUMMARY OF THE INVENTION

The present invention is directed to an improved fuel compensation method for a variable cam phase engine which predicts the phase of the cam at the midpoint of valve overlap and uses the predicted cam phase to compensate a base fuel pulse for the corresponding amount of diluent. If the cam phase is in transition to a desired value, the cam phase for purposes of compensation is predicted based on the current cam phase and its rate of change; otherwise, the cam phase is predicted based on the current cam phase. In a first interval of cam phase transition characterized by nonlinear change in cam phase, the cam phase is predicted by applying a nonlinear offset to the measured cam phase. In a second interval of cam phase transition characterized by substantially linear variation of cam phase, the cam phase is predicted by linear extrapolation of the measured cam phase, and limited to a range bounded by the measured cam phase and the desired cam phase.

BRIEF DESCRIPTION OF THE DRAWINGS

FIG. 2 is a main or executive flow diagram;

FIG. 3 details a portion of the flow diagram of FIG. 2 pertaining to cam phase logic; and FIG. 4 details a portion of the flow diagram of FIG. 2 pertaining to estimation of the cam phase.

DESCRIPTION OF THE PREFERRED EMBODIMENT

Figure 1:
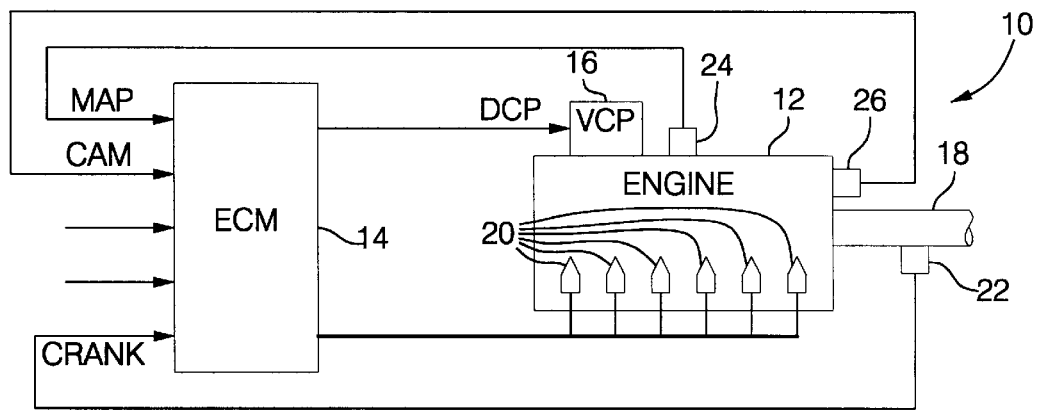
FIG. 1 is a block diagram of an engine control according to this invention, including a microprocessor-based engine control module (ECM).

Referring to FIG. 1, the reference numeral 10 generally depicts a motor vehicle drive train including an internal combustion engine 12 and a microprocessor-based engine control module (ECM) 14. The engine 12 is equipped with a variable cam phase mechanism (VCP) 16 which controls the phase relationship between the engine camshaft (not shown) and crankshaft 18 in response to a desired cam phase signal (DCP) generated by ECM 14. Engine 12 is also equipped with a number of fuel injectors 20 (one per engine cylinder) which are activated (typically in sequence) for intervals designed to provide a predetermined air/fuel mixture to the engine cylinders. The injection intervals are defined by a base pulse width (BPW), which is compensated for cam phase to form a finish pulse width (FPW). In the illustrated embodiment, the base pulse widths are determined in response to measures of engine speed (RPM) and manifold absolute pressure (MAP). The engine speed is provided by integrating the pulses from the crank position sensor 22 (in a known manner) and the manifold absolute pressure is provided by the pressure sensor 24. Other input signals relating to ambient temperature, barometric pressure, and exhaust oxygen feedback are also typically used. According to the invention, the cam phase compensation of the base pulse width is determined in response to the desired cam phase signal DCP and a measure of the actual cam phase (RAWCAM) calculated from the time difference between pulses from cam sensor 26 and crank position sensor 22, normalized by RPM.

In general, the ECM 14 determines the desired cam phase DCP based primarily on fuel efficiency and emission considerations. Retarding and advancing the cam phase has the effect of respectively shortening or lengthening the degree of overlap in the opening of the intake and exhaust valves of engine 12, which in turn, influences the primary fuelling consideration: engine air ingestion. According to the invention, the DCP and RAWCAM signals are used during cam phase transitioning to predict, for each fuel pulse being computed, what the cam phase will be at the center of valve overlap in the combustion cycle for which that fuel pulse will be injected. The predicted cam phase, also referred to herein as by the variable name FUELCAM, provides a measure of the corresponding exhaust gas diluent, and is used to create a diluent factor Fdil for modifying the base pulse width BPW to compensate for the cam phase adjustment. With the BPW compensation, the correct amount of fuel will be injected, so that the desired air/fuel ratio is preserved despite the cam phase control, allowing emissions to be minimized.

Figure 2:
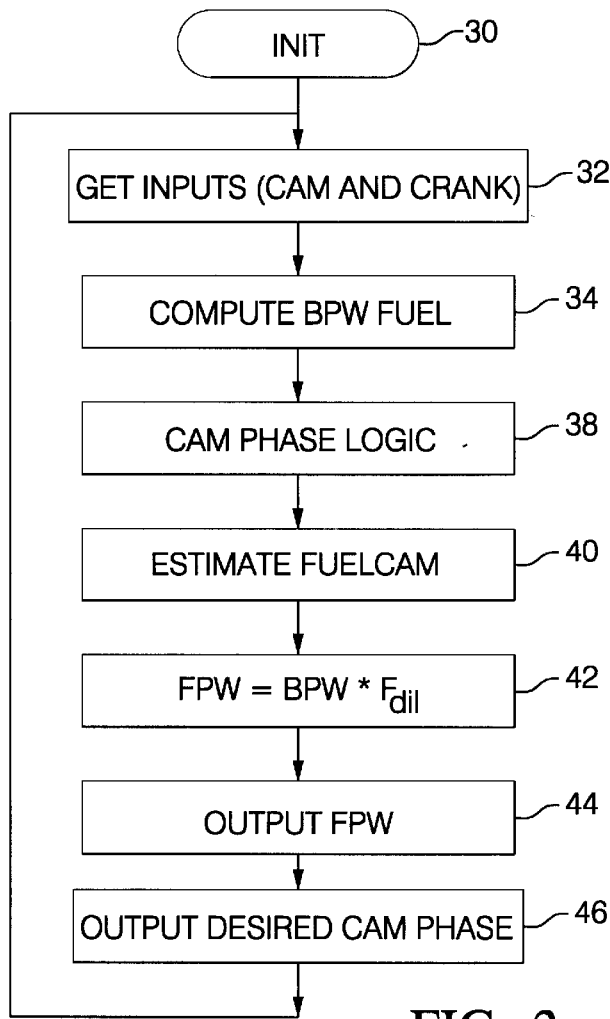
FIGS. 2–4 are flow diagrams representative of computer program instructions executed by the ECM of FIG. 1 in carrying out the control of this invention.
Figure 3:
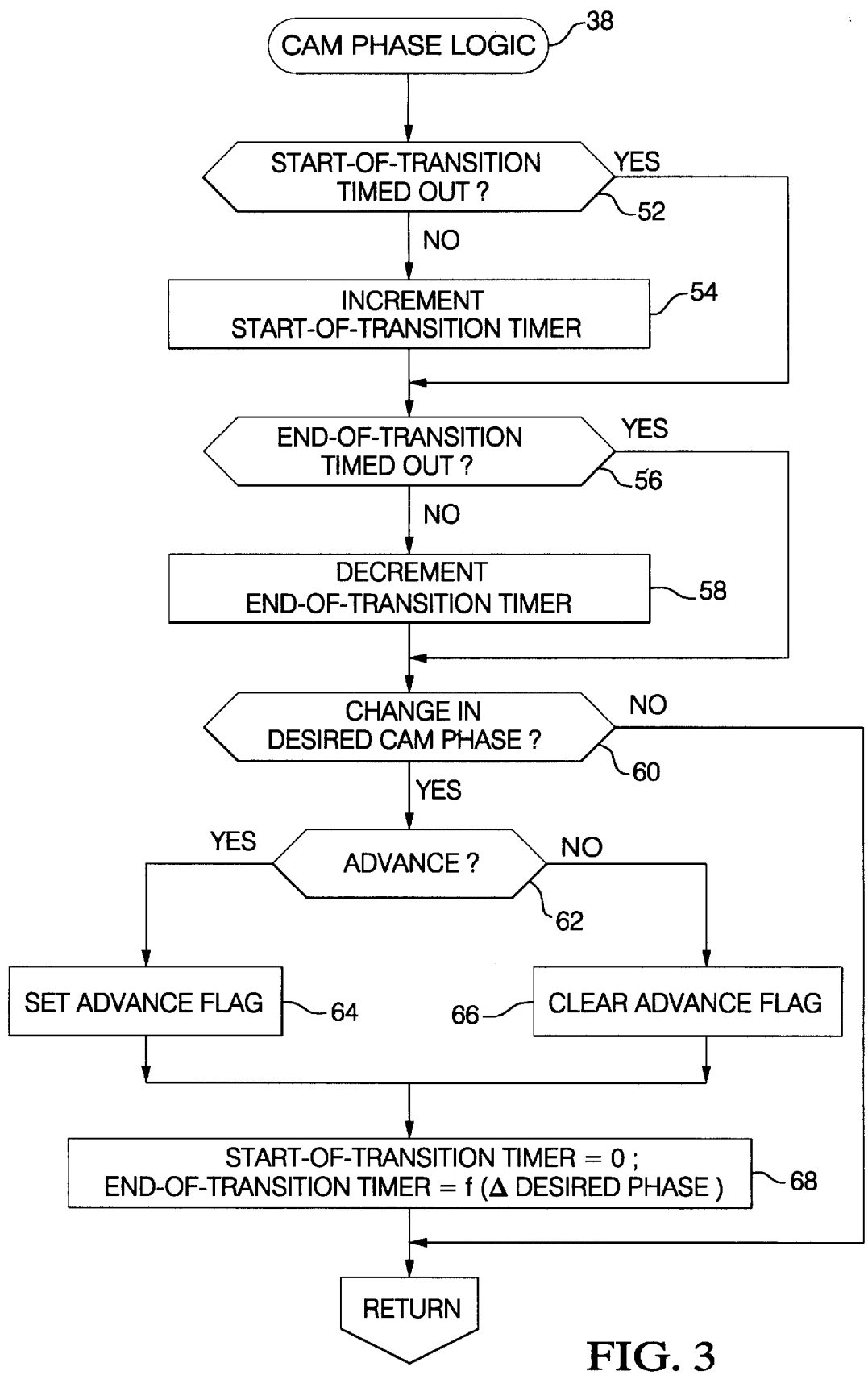
Figure 4:
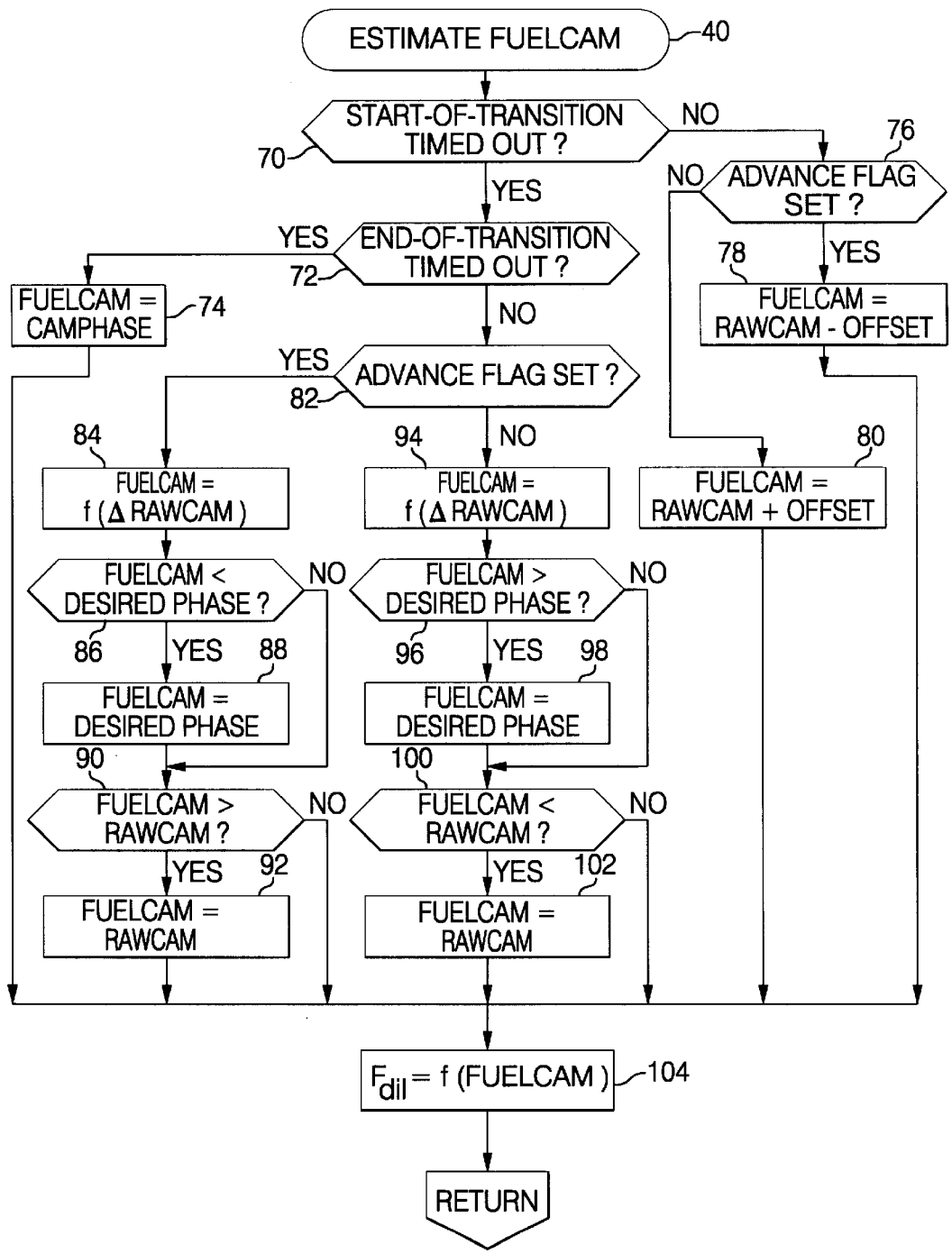

FIGS. 2–4 depict flow diagrams representative of computer program instructions executed by ECM 14 in carrying out the fuel compensation method of this invention. FIG. 2 is a main or executive flow diagram; FIG. 3 details a portion of the flow diagram of FIG. 2 pertaining to cam phase logic; and FIG. 4 details a portion of the flow diagram of FIG. 2 pertaining to estimation of FUELCAM and generation of the diluent factor Fdil.

Referring to FIG. 2, the initialization block 30 is executed at the initiation of each period of engine operation for the purpose of setting various parameters and flags to an initial condition. Thereafter, the blocks 32–44 are repeatedly executed to compute and output cam phase compensated output pulses for activating individual fuel injectors 20. Block 32 represents the reading of various relevant inputs such as MAP, RPM, oxygen sensor feedback, and RAWCAM, as well as associated signal processing. For example, RAWCAM is subjected to a first order low pass filter to form the term CAMPHASE. Block 34 then computes a base pulse width BPW for a given engine cylinder. Block 38 represents a cam phase logic routine, detailed in the flow diagram of FIG. 3, for identifying if the cam phase is in transition, and the stage of transition. Block 40 represents a FUELCAM estimation routine, detailed in the flow diagram of FIG. 4, for predicting FUELCAM based on the transition stage, and a corresponding diluent factor Fdil. At block 42, the diluent factor Fdil is applied to BPW to form the finish pulse width FPW, which is supplied to the corresponding fuel injector 20 at block 44, completing the fuel pulse routine for that engine cylinder. And block 46 determines the desired cam phase DCP and supplies the same to the VCP mechanism 16, as discussed above in reference to FIG. 1.

Referring now to the cam phase logic routine of FIG. 3, the blocks 52–58 are executed to update the status of two timers: a start-of-transition timer, and an end-of-transition timer. The start-of-transition timer defines an initial portion of each cam phase transition in which the change in cam phase is characteristically non-linear due to starting delay and acceleration of the VCP mechanism 16. While the actual duration of the initial portion depends on the VCP mechanism 16, a fixed duration of 45 msec is utilized in the illustrated embodiment. The end-of-transition timer identifies the remaining portion of the cam phase transition, and in such portion the change in cam phase with respect to time is generally linear. At blocks 52–54, the start-of-transition timer is incremented if not timed out—that is, if the timer value has not exceeded 45 msec. At blocks 56–58, the end-of-transition timer is decremented if not timed out—that is, if the timer value is greater than zero. If the desired cam phase (DCP) changes, as determined at block 60, blocks 64 or 66 are executed to set or clear the ADVANCE flag, depending on the direction of the desired change, as determined at block 62. In either case, the block 68 is then executed to reset the start-of-transition timer to zero, and to initialize the end-of-transition timer. The end-of-transition timer is initialized to a value determined as a function of the magnitude of the change in desired phase, since the end-of-transition interval is generally linear with respect to time, as indicated above.

Referring finally to FIG. 4, the cam phase estimation routine determines the value of FUELCAM (blocks 70–102) and the corresponding diluent factor Fdil (block 104). As indicated above, FUELCAM is a variable representing the cam phase that will be in effect at the center of valve overlap in the combustion cycle for which the fuel pulse width being computed in the current execution of the FIG. 2 fuel pulse routine is to be injected. Typically, the fuel pulse width calculations are performed in synchronization with engine crankshaft position so that the on and off times are loaded into timer registers of ECM 14 in advance of the start of injection. In the illustrated embodiment, each fuel pulse width is computed approximately 360 engine crankshaft rotation degrees prior to the midpoint of valve overlap for the combustion cycle of the respective engine cylinder. Accordingly, FUELCAM is a prediction of what the cam phase will be 360 degrees (of crankshaft rotation) in the future.

The blocks 70 and 72 determine the cam phase transition stage based on the start-of-transition and end-of-transition timers described above in reference to FIG. 3. If both blocks are answered in the affirmative, the cam phase is not in transition, and FUELCAM is set equal to the filtered cam phase measurement CAMPHASE, as indicated at block 74.

If block 70 is answered in the negative, the initial (nonlinear) portion of cam phase transition is in effect, and blocks 76–80 are executed to set FUELCAM according to the unfiltered cam phase measurement RAWCAM, but offset to approximate the initial non-linear movement of VCP mechanism 16. The offset values are empirically determined and stored, possibly as a function of RPM, and may be different for advance than retard. If the ADVANCE flag is set, as determined at block 76, the block 78 sets FUELCAM equal to (RAWCAM−OFFSET); if the ADVANCE flag is cleared, the block 80 sets FUELCAM equal to (RAWCAM+OFFSET).

If block 70 is answered in the affirmative, but block 72 is answered in the negative, the linear portion of the cam phase transition is in effect, and FUELCAM is estimated based on the average rate of change of cam phase ($\Delta$RAWCAM) in a preceding interval, such as 120 degrees of crankshaft rotation. Thus, in the illustrated embodiment, FUELCAM is determined as:

$$\text{FUELCAM} = \text{RAWCAM}_n + |(\text{RAWCAM}_{n-120°} - \text{RAWCAM}_n)|*3, \text{ if the ADVANCE flag is clear; and}$$

$$\text{FUELCAM} = \text{RAWCAM}_n - |(\text{RAWCAM}_{n-120°} - \text{RAWCAM}_n)|*3, \text{ if the ADVANCE flag is set,} \quad (1)$$

where $\text{RAWCAM}_{n-120°}$ is the value of RAWCAM from 120 degrees ago, and $\text{RAWCAM}_n$ is the current value of RAWCAM. However, the predicted value is limited, on one hand by the desired cam phase DCP, and on the other hand by the measured cam position RAWCAM. If the ADVANCE flag is set, as determined at block 82, the blocks 84–92 determine FUELCAM; if the ADVANCE flag is cleared, the blocks 94–102 determine FUELCAM. In the case of a retarding cam phase, FUELCAM is not allowed to exceed the greater of DCP or RAWCAM. In the case of an advancing cam phase, FUELCAM is not allowed to fall below the lesser of DCP or RAWCAM. In generic terms, the FUELCAM value determined according to equation (1) is limited to a range bounded by RAWCAM and DCP. Finally, as mentioned above, the diluent factor Fdil is set as a function of the determined value of FUELCAM; this relationship is also an empirical one, and may be determined by table look-up.

In summary, the control of this invention enables accurate fuel control in a variable cam phase engine by using readily available parameters to predict the cam phase for an upcoming combustion cycle. Although described in reference to the illustrated embodiment, it will be appreciated that the present invention has broader application and is not limited thereto. For example, the computation intervals and timer intervals may vary depending on the application, and so forth. Accordingly, controls incorporating these and other modifications may fall within the scope of this invention, which is defined by the appended claims.

What is claimed is:

1. A fuel control method for an internal combustion engine having a mechanism that controls cam phase to a desired value, the control method comprising the steps of:

computing a base quantity of fuel for injection into the engine during an upcoming combustion cycle of said engine;

estimating a phase at will be in effect during said upcoming combustion cycle;

modifying said base quantity of fuel based on said estimated cam phase; and injecting fuel into said engine for said upcoming combustion cycle in accordance with said modified base quantity of fuel.

2. The fuel control method of claim 1, including the steps of:

measuring the cam phase;

determining if said cam phase is in transition to said desired value;

estimating the cam phase based on said measured cam phase if it is determined that the cam phase is not in transition; and estimating the cam phase based on said measured cam phase and a rate of change of said measured cam phase if it is determined that the cam phase is in transition.

3. The fuel control method of claim 1, including the steps of:

measuring the cam phase; and if said cam phase is in transition to said desired value:

determining a rate of change of said measured cam phase; and estimating the cam phase that will be in effect during said upcoming combustion cycle based on said measured cam phase and the determined rate of change.

4. The fuel control method of claim 1, including the steps of:

measuring the cam phase; and if said cam phase is in transition to said desired value, estimating the cam phase by linear extrapolation of said measured cam phase.

5. The fuel control method of claim 4, wherein the estimated cam phase is limited to a range defined by said measured cam phase and said desired cam phase.

6. The fuel control method of claim 4, wherein the base quantity of fuel is computed 360 engine rotation degrees prior to said upcoming combustion cycle, and the cam phase is estimated according to:

$$RAWCAM_n + (RAWCAM_{n-120°} - RAWCAM_n) * 3$$

where $RAWCAM_n$ is a cam phase measured at the estimation of said cam phase, and $RAWCAM_{n-120°}$ is a cam phase measured 120 engine rotation degrees prior to the estimation of said cam phase.

7. The fuel control method of claim 1 including the steps of:

identifying a transition interval of said cam phase in response to a change in said desired value;

dividing said transition interval into a first portion characterized by nonlinear variation of said cam phase, and a second portion characterized by substantially linear variation of said cam phase;

measuring a current cam phase;

estimating the cam phase by applying a nonlinear offset to said measured cam phase during said first portion of said transition interval; and estimating the cam phase by linear extrapolation of said measured cam phase during said second portion of said transition interval.

8. The fuel control method of claim 6, wherein said second portion of said transition interval has a duration determined by a magnitude of the change in said desired value.

* * * * *